(12) United States Patent
Ohashi

(10) Patent No.: US 10,584,800 B2
(45) Date of Patent: Mar. 10, 2020

(54) REGULATING VALVE WITH PLANETARY GEAR TRANSMISSION

(71) Applicant: Azbil Corporation, Tokyo (JP)

(72) Inventor: Tomofumi Ohashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 124 days.

(21) Appl. No.: 15/887,244

(22) Filed: Feb. 2, 2018

(65) Prior Publication Data

US 2018/0224018 A1 Aug. 9, 2018

(51) Int. Cl.
*F16H 1/28* (2006.01)
*F16K 31/04* (2006.01)
(Continued)

(52) U.S. Cl.
CPC ............. *F16K 31/045* (2013.01); *F16H 3/54* (2013.01); *F16H 57/0006* (2013.01);
(Continued)

(58) Field of Classification Search
CPC .......... F16H 1/28; F16H 3/54; F16H 57/0006; F16K 31/041; F16K 31/045; F16K 31/535
See application file for complete search history.

(56) References Cited

U.S. PATENT DOCUMENTS

| 4,754,949 | A |   | 7/1988 | Fukamachi |           |
|-----------|---|---|--------|-----------|-----------|
| 5,662,542 | A | * | 9/1997 | Birchmeier | F24F 13/1426 |
|           |   |   |        |           | 475/154   |

(Continued)

FOREIGN PATENT DOCUMENTS

| CN | 103688118 A  | 3/2014 |
|----|--------------|--------|
| JP | H08-178119 A | 7/1996 |

(Continued)

OTHER PUBLICATIONS

Korean Intellectual Property Office, "Notification of Reason for Refusal," issued in Korean Patent Application No. 10-2018-0013245, which is a counterpart to U.S. Appl. No. 15/887,244, dated Jun. 3, 2019, 9 pages. (5 pages of English Translation of Office Action and 4 pages of Original Office Action).

(Continued)

*Primary Examiner* — Stacey A Fluhart

(74) *Attorney, Agent, or Firm* — Amster, Rothstein & Ebenstein LLP

(57) ABSTRACT

A setting/operating device includes a first motor; a sun gear that rotates by receiving a rotating force from the first motor; a first internal gear disposed so as to surround the sun gear; a second motor that applies a force to the first internal gear in a direction in which rotation of the first internal gear is prevented; a plurality of planetary gears disposed between the sun gear and the first internal gear, engaged with the sun gear and the first internal gear, and capable of rotating on the axes thereof while revolving around the sun gear; a rotation mechanism that rotates by receiving rotating forces of the plurality of planetary gears; an output shaft that is coupled to the rotation mechanism; and a spring unit that applies a rotating force to the output shaft when supply of electric power to the first motor and the second motor is stopped.

6 Claims, 6 Drawing Sheets

(51) Int. Cl.
    *F16K 31/53*         (2006.01)
    *F16H 3/54*          (2006.01)
    *F16H 57/00*        (2012.01)
    *F16H 1/06*          (2006.01)

(52) U.S. Cl.
    CPC .......... *F16K 31/041* (2013.01); *F16K 31/535* (2013.01); *F16H 1/06* (2013.01); *F16H 1/28* (2013.01)

(56) References Cited

U.S. PATENT DOCUMENTS

| | | | | |
|---|---|---|---|---|
| 2014/0124688 A1* | 5/2014 | Hapke | ................... | H02K 26/00 |
| | | | | 251/129.11 |
| 2017/0067549 A1* | 3/2017 | Heiraas | ................... | F16H 33/06 |
| 2018/0019639 A1* | 1/2018 | Yang | ......................... | F16H 1/28 |

FOREIGN PATENT DOCUMENTS

| | | | |
|---|---|---|---|
| JP | 2004-327154 A | 11/2004 |
| JP | 2016-023684 A | 2/2016 |
| KR | 200450505 Y1 | 10/2010 |

OTHER PUBLICATIONS

The State Intellectual Property Office of People's Republic of China, "First Office Action," issued in Chinese Patent Application No. 201810105292.3, which is a counterpart to U.S. Appl. No. 15/887,244, dated Mar. 4, 2019, 16 pages (9 pages of English Translation of Office Action and 7 pages of Original Chinese Office Action).

\* cited by examiner

REGULATING VALVE WITH PLANETARY GEAR TRANSMISSION

CROSS-REFERENCE TO RELATED APPLICATION

The present application claims the benefit of and priority to Japanese Patent Application No. 2017-018446, filed on Feb. 3, 2017, the entire contents of which are incorporated by reference herein.

TECHNICAL FIELD

The present invention relates to a setting/operating device for operating equipment and relates, for example, to a setting/operating device for operating a valve stem of a rotary-type regulating valve.

BACKGROUND ART

An electric setting/operating device (actuator) for operating a rotary-type regulating valve, such as a butterfly valve, drives a valve stem coupled to an output shaft by transmitting a rotating force generated from a driving motor to the output shaft via a gear mechanism.

Such a setting/operating device generally has an emergency shutoff function that closes the regulating valve when the supply of electric power is stopped by interruption of electric service or the like. There is a known spring return type setting/operating device that closes a regulating valve by forcibly rotating an output shaft using a spring unit provided separately from the above gear mechanism as an electric setting/operating device having this emergency shutoff function.

A driving motor of the electric setting/operating device generally has a detent torque. Accordingly, when the supply of electric power to the setting/operating device is stopped, it is difficult to rotate the gear mechanism coupled to the driving motor from the output shaft side using the torque from the spring unit. Therefore, a general spring return type setting/operating device has a clutch mechanism for disconnecting the coupling between the driving motor and the gear mechanism. However, in spring return operation that drives the output shaft using a torque from the spring unit in the state in which the coupling to the driving motor is disconnected by the clutch mechanism, the rotation speed of the output shaft is higher than in motor operation that drives the output shaft using the rotating force of the driving motor. Accordingly, when the rotation of the output shaft is stopped by return operation, a large impact (referred to below as a "return impact") is applied to gears included in the gear mechanism. Therefore, the conventional spring return type setting/operating device has a brake mechanism to reduce a return impact applied to gears, in addition to the clutch mechanism described above (see PTL 1 and PTL 2).

CITATION LIST

Patent Literature

[PTL 1] JP-A-8-178119
[PTL 2] JP-A-2016-023684

SUMMARY

However, in setting/operating devices that transmit a rotating force from the driving motor to the output shaft via a power transmitting mechanism including a gear mechanism having connected spur gears or a planetary gear mechanism as the setting/operating devices disclosed in PTL 1 and PTL 2, a return impact is applied to specific teeth of gears every time when the rotation of the output shaft is stopped by spring return operation. Accordingly, even if a return impact is reduced by installing a brake mechanism, since a return impact is applied to the same teeth of a gear every time, the service life of the setting/operating device is determined by the service life of the specific teeth. This problem also arises when a paradox planetary gear mechanism is adopted as the power transmitting mechanism of a setting/operating device.

In addition, when a clutch mechanism and a brake mechanism are installed as in the setting/operating devices disclosed in PTL 1 and PTL 2, there is a problem in that the structure of a setting/operating device is complicated and the size of the setting/operating device is large.

The invention addresses the above problem with an object of prolonging the service life of gears included in a power transmitting mechanism of an electric setting/operating device having a spring unit and reducing the size of the electric setting/operating device.

A setting/operating device (100, 100A, 100B) according to the invention includes a first motor (8A); a sun gear (2) that rotates by receiving a rotating force from the first motor; a first internal gear (3) that has teeth on an inner peripheral surface thereof, the first internal gear being disposed so as to surround the sun gear; a second motor (8B) that applies a force to the first internal gear in a direction in which rotation of the first internal gear is prevented; a plurality of planetary gears (4) that are disposed between the sun gear and the first internal gear, engaged with the sun gear and the first internal gear, and capable of rotating on axes thereof while revolving around the sun gear; a rotation mechanism (6, 11) that rotates by receiving rotating forces of the plurality of planetary gears; an output shaft (7) that is coupled to the rotation mechanism; and a spring unit (9) that applies a rotating force to the output shaft when supply of electric power to the first motor and the second motor is stopped.

In the setting/operating device, a holding torque of the second motor when the second motor is excited may be larger than the rotating force applied by the spring unit to the output shaft and a detent torque of the second motor may be smaller than the rotating force applied by the spring unit to the output shaft.

In the setting/operating device, the setting/operating device may further include a rotation control mechanism (5) that is coupled to the second motor and the first internal gear and transmits, in a direction in which the rotation of the first internal gear is prevented, the holding torque of the second motor to the first internal gear.

In the setting/operating device, the rotation mechanism may include a second internal gear (6) that has teeth to be engaged with the planetary gears on the inner peripheral surface thereof, the second internal gear being rotatable concentrically with the first internal gear.

In the setting/operating device, the rotation mechanism may include a carrier (11) that rotatably supports the plurality of planetary gears on the axes thereof and transmit the motion of revolution of the plurality of planetary gears to the output shaft.

In the above description, as an example, reference numerals in drawings corresponding to components of the invention are designated in parentheses.

As described above, according to the invention, it is possible to prolong the service life of gears included in the power transmitting mechanism of the electric setting/operating device having a spring unit and to reduce the size of the electric setting/operating device.

DETAILED DESCRIPTION

Figure 1:
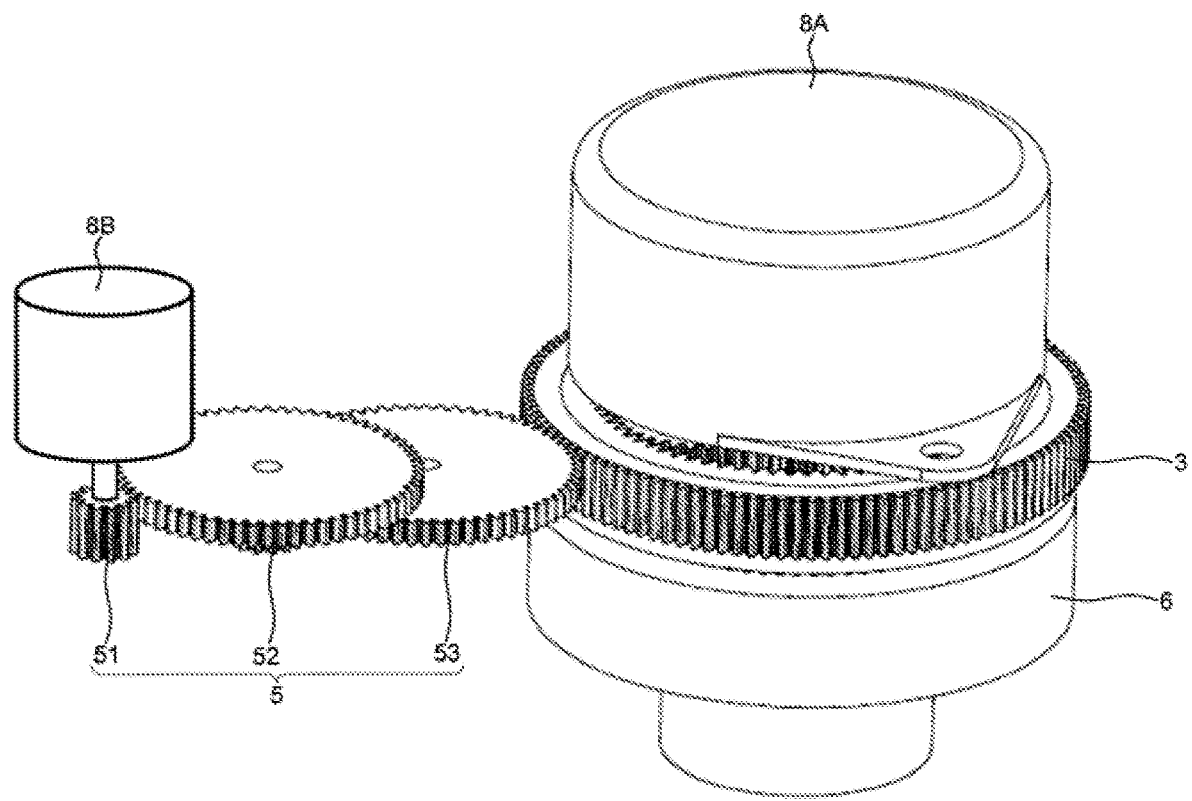
FIG. 1 is a perspective view illustrating a power transmitting mechanism of a setting/operating device according to embodiment 1.

Embodiments of the invention will be described below with reference to the drawings. It should be noted that components common to the individual embodiments are given the same reference numerals to omit repeated descriptions.

Embodiment 1

FIGS. 1 to 4 illustrate the power transmitting mechanism of the setting/operating device according to embodiment 1.

Figure 2:
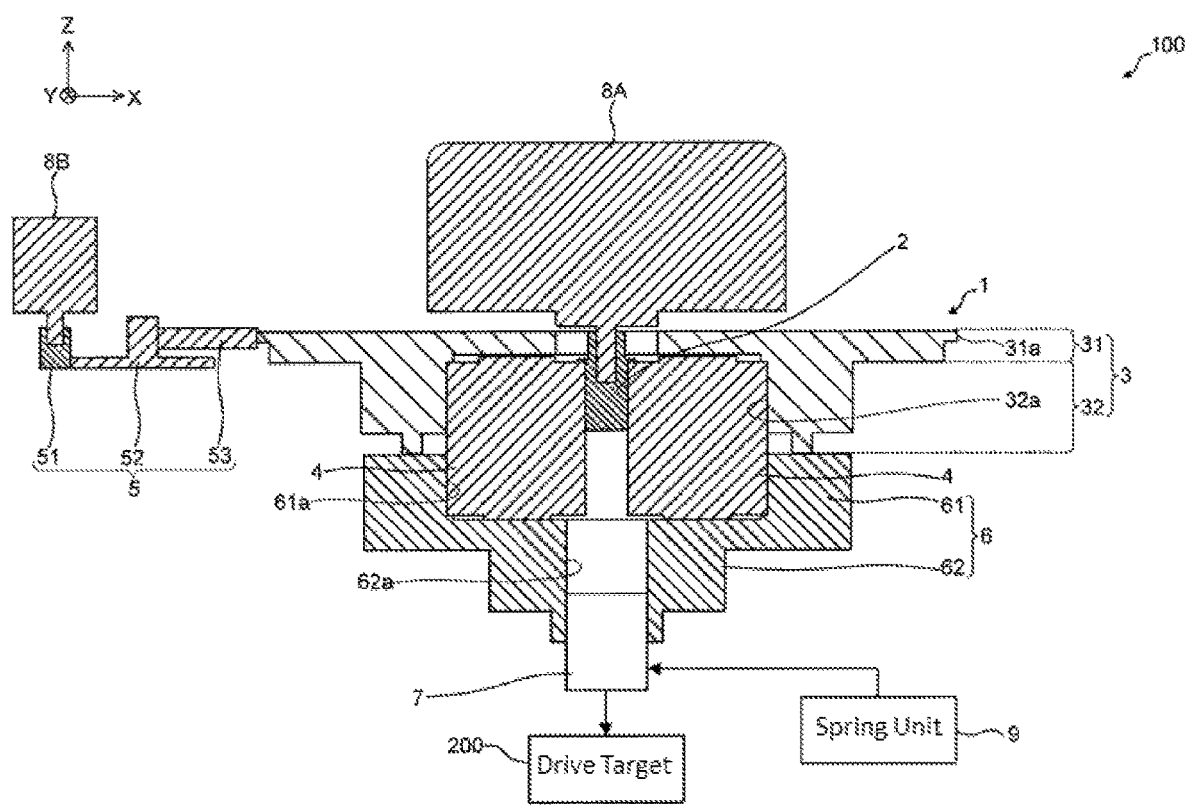
FIG. 2 is a cross-sectional view illustrating the power transmitting mechanism of the setting/operating device according to embodiment 1.
Figure 3:
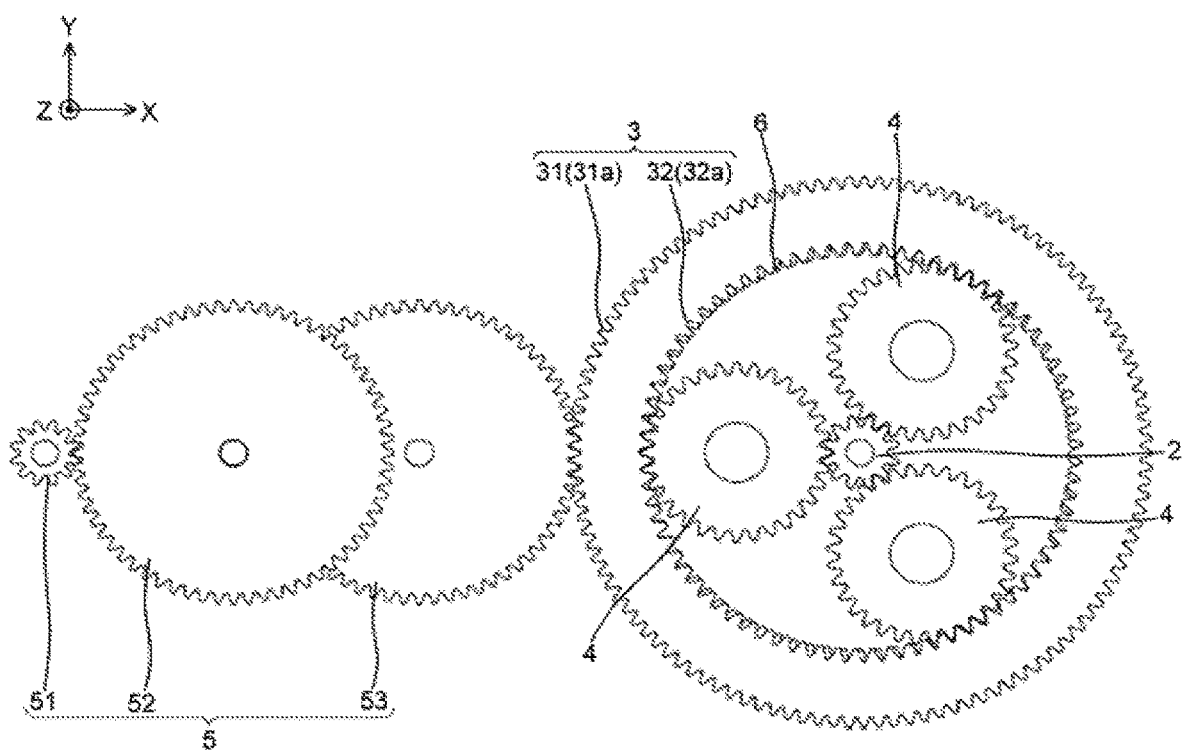
FIG. 3 is a plan view illustrating the power transmitting mechanism of the setting/operating device according to embodiment 1.
Figure 4:
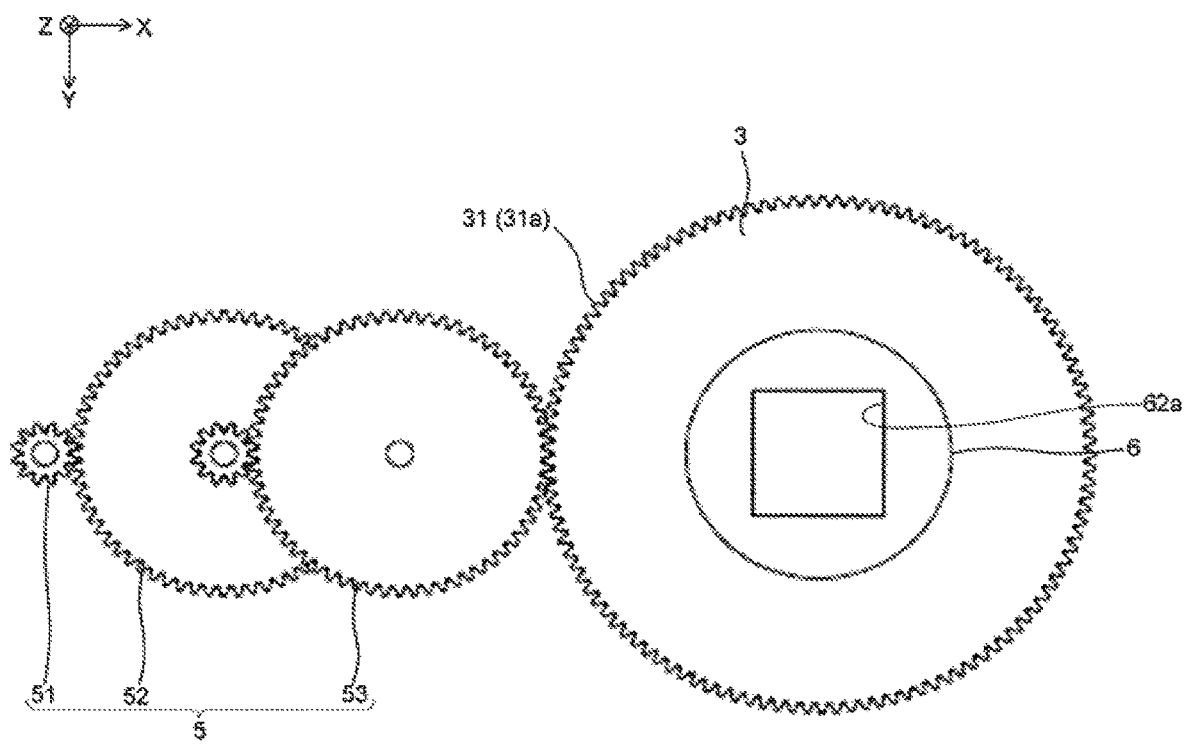
FIG. 4 is another plan view illustrating the power transmitting mechanism of the setting/operating device according to embodiment 1.

FIG. 1 is a perspective view illustrating the power transmitting mechanism of a setting/operating device 100, FIG. 2 is a cross-sectional view illustrating the power transmitting mechanism of the setting/operating device 100, and FIGS. 3 and 4 are plan views illustrating the power transmitting mechanism of the setting/operating device 100.

The setting/operating device 100 according to embodiment 1 is, for example, an electric setting/operating device (actuator) that operates a rotary-type regulating valve such as a butterfly valve used for process control of a flow rate in a plant or the like. For example, the setting/operating device 100 controls the valve opening of a regulating valve by operating the valve stem based on an operation signal supplied from a positioner provided outside. In addition, the setting/operating device 100 has the emergency shutoff function that closes a regulating valve by spring return operation that drives the output shaft using a torque from a spring unit 9 during power-off.

Specifically, when electric power is supplied, the setting/operating device 100 transmits a rotating force from a driving motor 8A to the valve stem as a drive target 200 by suppressing the rotation of a first internal gear 3, which is one of the gears constituting a power transmission portion 1, so as to cause the power transmission portion 1 to function as a paradox planetary gear mechanism. In contrast, when electric power is not supplied, the setting/operating device 100 closes the regulating valve by operating the valve stem by enabling the rotation of the first internal gear 3, integrally rotating a plurality of gears constituting the paradox planetary gear mechanism described above using an input torque from the spring unit 9.

The specific structure of the setting/operating device 100 will be described in detail below.

In the embodiment, the detailed description and illustration of some components of the setting/operating device 100 are omitted to clarify the structure of the power transmitting mechanism of the setting/operating device 100. For example, although the setting/operating device 100 has the electronic circuit portion that controls the rotation of the driving motor 8A based on an operation signal supplied from the positioner, a power supply unit, and the like in addition to electric power transmitting mechanism, the detailed description and illustration of these components are omitted in the embodiment.

As illustrated in FIG. 1, the setting/operating device 100 includes the driving motor 8A as the first motor, a fixing motor 8B as the second motor, the power transmission portion 1, and the spring unit 9.

The driving motor 8A is a component that generates a rotating force for operating the valve stem as the drive target 200 when electric power is supplied to the setting/operating device 100 (during normal operation). The driving motor 8A is an electric motor for which rotation is controlled by supplying power via the electronic circuit portion (not illustrated) described above and the driving motor 8A is, for example, a brushless motor or a stepping motor.

The fixing motor 8B is a component that applies a force to the first internal gear 3 in a direction in which the rotation of the first internal gear 3, which is one of gears included in the power transmission portion 1, is prevented when electric power is supplied to the setting/operating device 100. The fixing motor 8B is an electric motor excited when electric power is supplied via the electronic circuit portion (not illustrated) described above as in the driving motor 8A and the fixing motor 8B is, for example, a brushless motor or a stepping motor.

When the fixing motor 8B is excited, the output shaft of the fixing motor 8B becomes stationary. The force generated on the output shaft of the fixing motor 8B when the fixing motor 8B is excited is referred to below as the "holding torque".

The fixing motor 8B generates a force (holding torque) against the force that is transmitted from the driving motor 8A to the first internal gear 3 via a sun gear 2 and a planetary gear 4 and tries to rotate the first internal gear 3 when electric power is supplied to the setting/operating device 100 (that is, when the fixing motor 8B is energized). This force suppresses the rotation of the first internal gear 3 by being applied to the first internal gear 3 via a rotation control mechanism 5, which will be described later.

In contrast, when the supply of electric power to the setting/operating device 100 is stopped (that is, the fixing motor 8B is not energized), the fixing motor 8B brakes the rotation of the first internal gear 3 using a detent torque.

The detent torque of the fixing motor 8B only needs to be set as appropriate in consideration of the detent torque of the driving motor 8A, the speed reduction ratio as the gear mechanism, the torque of the spring unit 9 during spring operation, and the spring operation time during spring operation. For example, it is only necessary to select the detent torque of the fixing motor 8B so as to enable the spring operation by the spring unit 9 in the state in which the detent torque of the driving motor 8A suppresses the rotation of the sun gear 2.

The power transmission portion 1 is a function portion that opens and closes the regulating valve by transmitting a rotating force from the driving motor 8A to the valve stem as the drive target 200.

The spring unit 9 is a function portion that closes the regulating valve by operating the valve stem when the supply of electric power to electronic components including the driving motor 8A of the setting/operating device 100 is stopped. The spring unit 9 is a setting/operating device having a spring member such as, for example, a spiral spring. Specifically, the spring unit 9 stores energy by winding the spring member while electric power is supplied to the driving motor 8A or the like and closes the regulating valve by releasing the energy stored in the spring member and driving an output shaft 7, which will be described later, of the power transmission portion 1 when the supply of electric power to the driving motor 8A or the like is stopped.

Next, the specific structure of the power transmission portion 1 will be described.

As illustrated in FIGS. 1 to 4, the power transmission portion 1 includes the sun gear 2, the first internal gear 3, the planetary gears 4, the rotation control mechanism 5, a rotation mechanism 6, and the output shaft 7. The sun gear 2, the first internal gear 3, the plurality of planetary gears 4, the rotation control mechanism 5, and the rotation mechanism 6 included in the power transmission portion 1 are accommodated in a housing (not illustrated) made of, for example, metal.

The sun gear 2 is a gear component that rotates (rotates on the axis thereof) by receiving a rotating force from the driving motor 8A. As illustrated in FIG. 1, one end of the sun gear 2 is coupled to the rotation shaft of the driving motor 8A.

The first internal gear 3 is a gear component that is disposed so as to surround the sun gear 2, has teeth on the inner peripheral surface thereof, and is provided rotatably. Specifically, the first internal gear 3 includes an internal gear portion 32 and an external gear portion 31.

The internal gear portion 32 has teeth 32a to be engaged with the plurality of planetary gears 4, which will be described later, on the inner peripheral surface thereof. The internal gear portion 32 guides the rotation of the plurality of planetary gears 4. The external gear portion 31 has a plurality of teeth 31a to be engaged with gears included in the rotation control mechanism 5 on the outer peripheral surface thereof. The internal gear portion 32 and the external gear portion 31 are, for example, formed integrally with each other.

The rotation control mechanism 5 controls the rotation of the first internal gear 3 based on the rotating force of the fixing motor 8B. More specifically, the rotation control mechanism 5 has a gear mechanism that is coupled to the fixing motor 8B and the first internal gear 3 and transmits the holding torque of the fixing motor 8B to the first internal gear 3 in a direction in which the rotation of the first internal gear 3 is prevented. For example, as illustrated in FIGS. 1 to 4, the rotation control mechanism 5 includes a gear 51 coupled to the output shaft of the fixing motor 8B, a gear 52 to be engaged with the gear 51, and a gear 53 to be engaged with the gear 52 and the external gear portion 31 of the first internal gear 3.

The speed reduction ratio of the rotation control mechanism 5 as the gear mechanism (that is, the type of gears, the number of gears, the number of teeth of each gear, and the like included in the gear mechanism) only needs to be set as appropriate in consideration of the torque of the spring unit 9 during spring operation and the detent torque of the fixing motor 8B.

The planetary gears 4 are gear components that are engaged with the sun gear 2 and the first internal gear 3 and are capable of rotating on the axes thereof while revolving around the sun gear 2. In the setting/operating device 100, the plurality (for example, three) of planetary gears 4 are disposed between the sun gear 2 and the first internal gear 3. FIGS. 1 to 4 illustrate the case in which three planetary gears are disposed between the sun gear 2 and the first internal gear 3 as an example.

The rotation mechanism 6 is a component that rotates by receiving rotating forces of the plurality of planetary gears 4. The rotation mechanism 6 is a second internal gear that has teeth to be engaged with the planetary gears 4 on the inner peripheral surface thereof and is rotatable concentrically with the first internal gear 3. The second internal gear functions as a movable internal gear that transmits the motion of the rotation and revolution of the plurality of the planetary gears 4 to the output shaft 7. The rotation mechanism 6 is also referred to below as "the second internal gear 6".

Specifically, the second internal gear 6 includes a gear portion 61 having teeth 61a to be engaged with the plurality of planetary gears 4 on the inner peripheral surface thereof and a supporting portion 62 that rotatably supports the plurality of planetary gears 4. A hole 62a is formed in the supporting portion 62. The output shaft 7 is inserted into the hole 62a of the supporting portion 62.

The output shaft 7 is a component that rotates the valve stem of the regulating valve as the drive target 200 according to the rotating force of the second internal gear 6. Specifically, the output shaft 7 has one end inserted into and coupled to the hole 62a of the second internal gear 6 and the other end coupled to the valve stem as the drive target 200.

The sun gear 2, the first internal gear 3, the plurality of planetary gears 4, the rotation control mechanism 5, and the second internal gear 6 described above are made of resin material (for example, polyacetal resin).

Next, the operation principle of the setting/operating device 100 will be described.

First, the case in which electric power is supplied to the setting/operating device 100 will be described.

When electric power is supplied to the setting/operating device 100, the driving motor 8A and the fixing motor 8B are energized. The fixing motor 8B applies a force (holding torque) to the first internal gear 3 via the rotation control mechanism 5 in a direction in which the rotation of the first internal gear 3 is prevented. With this, the first internal gear 3 enters the unrotatable state and functions as a fixed internal gear. That is, one paradox planetary gear mechanism (reducer) is achieved by the sun gear 2, the plurality of the planetary gears 4, the first internal gear 3 (fixed internal gear), and the second internal gear (movable internal gear) 6.

When the rotation shaft of the driving motor 8A rotates in this state, the rotating force is transmitted to the sun gear 2 and the sun gear 2 rotates. The rotating force of the sun gear 2 causes the plurality of the planetary gears 4 engaged with the sun gear 2 to revolve along the inner periphery of the internal gear portion 32 of the first internal gear 3 as a fixed internal gear while rotating on the axes thereof. The rotating forces of the plurality of the planetary gears 4 rotate the second internal gear 6 as a movable internal gear engaged with the planetary gears 4. With this, the output shaft 7 coupled to the second internal gear 6 rotates. The valve stem is coupled to the output shaft 7, the valve stem is rotated by the rotating force obtained by greatly reducing the rotating force of the driving motor 8A, and the valve opening of the regulating valve can be controlled.

Next, the case in which the supply of electric power to the setting/operating device 100 is stopped will be described.

In this case, the supply of electric power to the driving motor 8A and the fixing motor 8B is stopped, the energy stored in the spring member of the spring unit 9 is released, and a torque is input from the spring unit 9 to the output shaft 7. The torque is applied to the second internal gear 6 via the output shaft 7. With this, the rotating force is applied from the second internal gear 6 to the first internal gear 3 and the sun gear 2 via the plurality of the planetary gears 4.

In contrast, a force is applied to the sun gear 2 by the detent torque of the driving motor 8A in a direction in which the rotating force from the spring unit 9 is canceled. Similarly, a force is applied to the first internal gear 3 by the detent torque of the fixing motor 8B in a direction in which the rotating force from the spring unit 9 is canceled.

At this time, when the torque applied from the spring unit 9 to the first internal gear 3 via the output shaft 7, the second internal gear 6, and the plurality of planetary gears 4 is larger than the detent torque applied from the fixing motor 8B to the first internal gear 3 via the rotation control mechanism 5, the second internal gear 6, the plurality of planetary gears 4, and the first internal gear 3 integrally rotate around the sun gear 2. That is, since the first internal gear 3 enters the rotatable state, the self-lock function of the paradox planetary gear mechanism including the sun gear 2, the plurality of the planetary gears 4, the first internal gear 3, and the second internal gear 6 is released, thereby enabling the spring unit 9 to operate the output shaft 7 (valve stem). It should be noted that the planetary gears 4 do not rotate on the axes thereof at this time.

As described above, when the gear mechanism is configured so that the torque applied from the spring unit 9 to the first internal gear 3 via the output shaft 7, the second internal gear 6, and the plurality of planetary gears 4 is larger than the detent torque applied from the fixing motor 8B to the first internal gear 3 via the rotation control mechanism 5, the input torque from the spring unit 9 can integrally rotate the second internal gear 6, the plurality of planetary gears 4, and the first internal gear 3 around the sun gear 2 and close the regulating valve during power-off.

To make the torque applied from the spring unit 9 to the first internal gear 3 via the output shaft 7, the second internal gear 6, and the plurality of planetary gears 4 larger than the detent torque applied from the fixing motor 8B to the first internal gear 3 via the rotation control mechanism 5, it is only necessary to use an electric motor having a detent torque smaller than the torque input from the spring unit 9 to the output shaft 7 as, for example, the fixing motor 8B in consideration of the speed reduction ratio of the rotation control mechanism 5.

When the regulating valve is closed by spring return operation in the setting/operating device 100 according to embodiment 1, the second internal gear 6, the plurality of the planetary gears 4, and the first internal gear 3 receive a return impact as in the gear mechanism of the conventional setting/operating device. However, in the setting/operating device 100, the second internal gear 6, the plurality of the planetary gears 4, and the first internal gear 3 integrally revolve around the sun gear 2 in the engagement state obtained during power-off when spring return operation is performed. Accordingly, the combination of teeth of the gears that receive a return impact depends on the engagement during power-off. The combination of gears during power-off is likely to differ every time. Accordingly, unlike the gear mechanism of the conventional setting/operating device in which particular teeth receive a return impact every time, the teeth that receive a return impact can be changed every time in the setting/operating device 100.

In addition, since the detent torque of the fixing motor 8B suppresses the rotation speed during return operation, a return impact can be reduced.

As described above, unlike the conventional spring return type setting/operating device having the structure in which the coupling between the driving motor 8A and the gear mechanism is disconnected, the setting/operating device 100 according to embodiment 1 has the structure in which the fixing motor 8B disposed separately from the driving motor 8A switches between the rotatable state and the unrotatable state of the first internal gear 3 functioning as the fixed internal gear of the paradox planetary gear mechanism. With this, since the second internal gear 6, the plurality of planetary gears 4, and the first internal gear 3 integrally revolve around the sun gear 2 in the engagement state obtained during power-off in spring return operation during power-off as described above, the combination of teeth of the gears that receive a return impact can be changed every time. With this, it is possible to make the service life of gears included in the gear mechanism longer than in the electric setting/operating device having the conventional spring unit in which particular teeth receive a return impact every time during spring return operation.

In addition, since the paradox planetary gear mechanism generally has a self-lock function that blocks rotation by an input torque from the output side, it is difficult to apply this mechanism as the power transmitting mechanism of the spring return type setting/operating device. However, since the power transmission portion 1 according to the embodiment has the structure in which the fixing motor 8B switches the first internal gear 3 functioning as the fixed internal gear of the paradox planetary gear mechanism from the unrotatable state to the rotatable state, the self-lock function of the paradox planetary gear mechanism can be released during power-off. With this, since the power transmission portion 1 can be applied as the power transmitting mechanism of the spring return type setting/operating device, it is possible to achieve a spring return type setting/operating device that has a smaller size and lower cost.

In addition, since the setting/operating device 100 according to embodiment 1 achieves the clutch mechanism and the brake mechanism of the conventional spring return type setting/operating device using the fixing motor 8B coupled to the first internal gear 3 as the fixed internal gear, the number of components can be reduced as compared with the conventional setting/operating device and the size of the product can be reduced.

Embodiment 2

Figure 5:
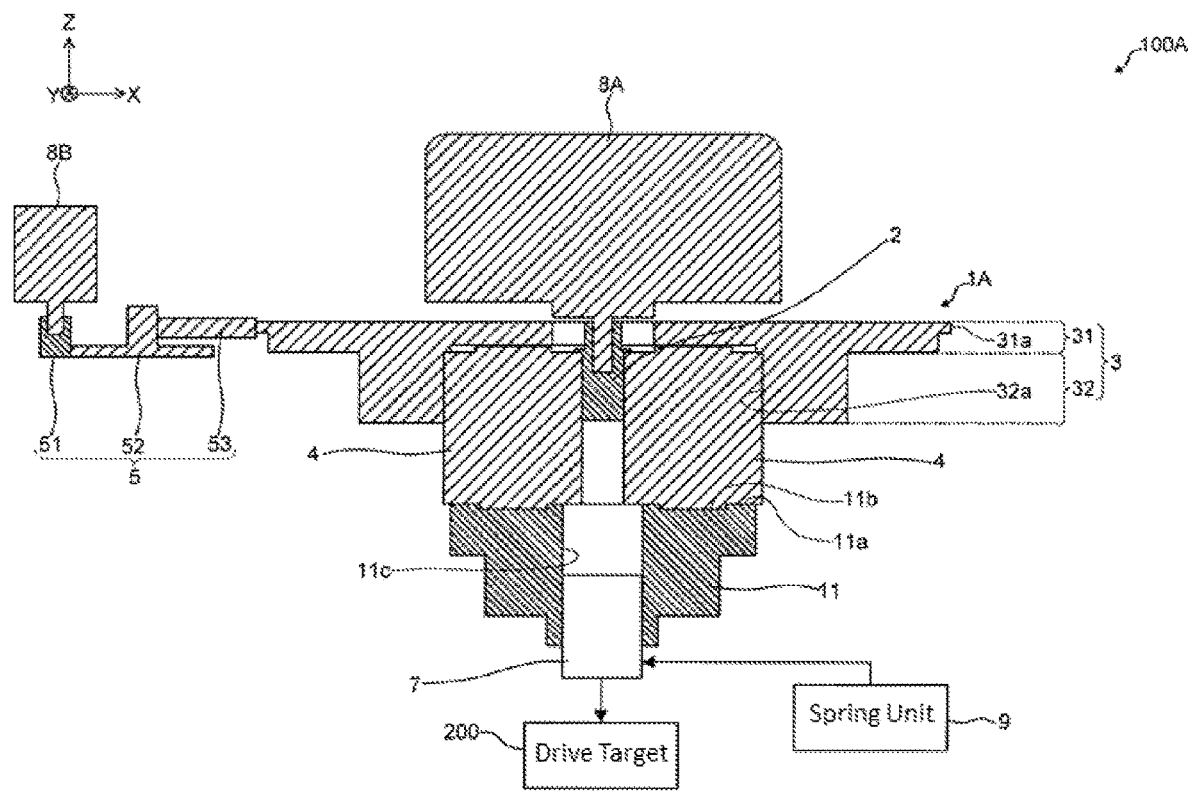
FIG. 5 is a cross-sectional view illustrating a power transmitting mechanism of a setting/operating device according to embodiment 2.

FIG. 5 is a cross-sectional view illustrating the power transmitting mechanism of the setting/operating device according to embodiment 2.

A setting/operating device 100A according to embodiment 2 is the same as the setting/operating device 100 according to embodiment 1 except that the setting/operating device 100A has the planetary gear mechanism as the power transmission portion.

Specifically, a power transmission portion 1A of the setting/operating device 100A has a carrier 11 that supports the plurality of planetary gears 4 so as to rotate on the axes thereof in place of the second internal gear 6 as the rotation mechanism and transmits the motion of revolution of the plurality of planetary gears 4 to the output shaft 7.

The carrier 11 is disposed facing the first internal gear 3 via the plurality of planetary gears 4. Specifically, the carrier 11 and the first internal gear 3 rotatably clamp and hold the plurality of planetary gears 4 in the vertical direction. Specifically, the plurality of planetary gears 4 are supported rotatably (revolvably) on a supporting surface 11a of the carrier 11 by inserting parts of the planetary gears 4 into a groove 11b formed on the supporting surface 11a of the carrier 11. In addition, a hole 11c is formed in the supporting surface 11a of the carrier 11 as in the second internal gear 6 according to embodiment 1 and the output shaft 7 is inserted into the hole 11c.

In the setting/operating device 100A according to embodiment 2, when electric power is supplied to the setting/operating device 100A, the first internal gear 3 is fixed by the fixing motor 8B and enters the unrotatable state on the same principle as in the setting/operating device 100 according to embodiment 1. When the rotating force of the driving motor 8A is applied to the sun gear 2 in this state, the plurality of the planetary gears 4 disposed around the sun gear 2 revolves around the sun gear 2 along the inner peripheral surface of the fixed first internal gear 3. The carrier 11 rotates concentrically with the sun gear 2 by receiving rotating forces of the planetary gears 4. With this, the output shaft 7 coupled to the carrier 11 rotates to enable the valve stem to be operated.

In contrast, when the supply of electric power to the setting/operating device 100A is stopped, the first internal gear 3 is fixed only by the detent torque of the fixing motor 8B on the same principle as in the setting/operating device 100 according to embodiment 1. When a torque larger than this detent torque is applied from the spring unit 9 to the first internal gear 3 via the output shaft 7, the carrier 11, and the plurality of planetary gears 4 in this state, then the carrier 11, the plurality of planetary gears 4, and the first internal gear 3 integrally rotate around the sun gear 2. With this, the output shaft 7 rotates and the regulating valve is closed. In addition, since the detent torque of the fixing motor 8B suppresses the rotation speed during return operation, a return impact can be reduced.

As described above, in the setting/operating device 100A according to embodiment 2, even when the planetary gear mechanism is adopted in place of the paradox planetary gear mechanism as a power transmission portion for transmitting the power of the driving motor to the valve stem, since the combination of teeth of gears that receive a return impact during spring return operation can be changed every time as in the setting/operating device 100 according to embodiment 1, the service life of gears included in the planetary gear mechanism can be prolonged.

Expansion of Embodiments

Although the invention implemented by the inventors and the like has been described above specifically based on embodiments, the invention is not limited to the embodiments and it will be appreciated that various modifications can be made without departing from the scope of the invention.

For example, although the rotation control mechanism 5 includes three gears in embodiments 1 and 2, the number of gears is not limited to this number. For example, the rotation control mechanism 5 may include only the gear 51 and the gear 51 may be coupled to the first internal gear 3. Alternatively, the fixing motor 8B and the first internal gear 3 may be directly coupled to each other without providing the rotation control mechanism 5.

Figure 6:
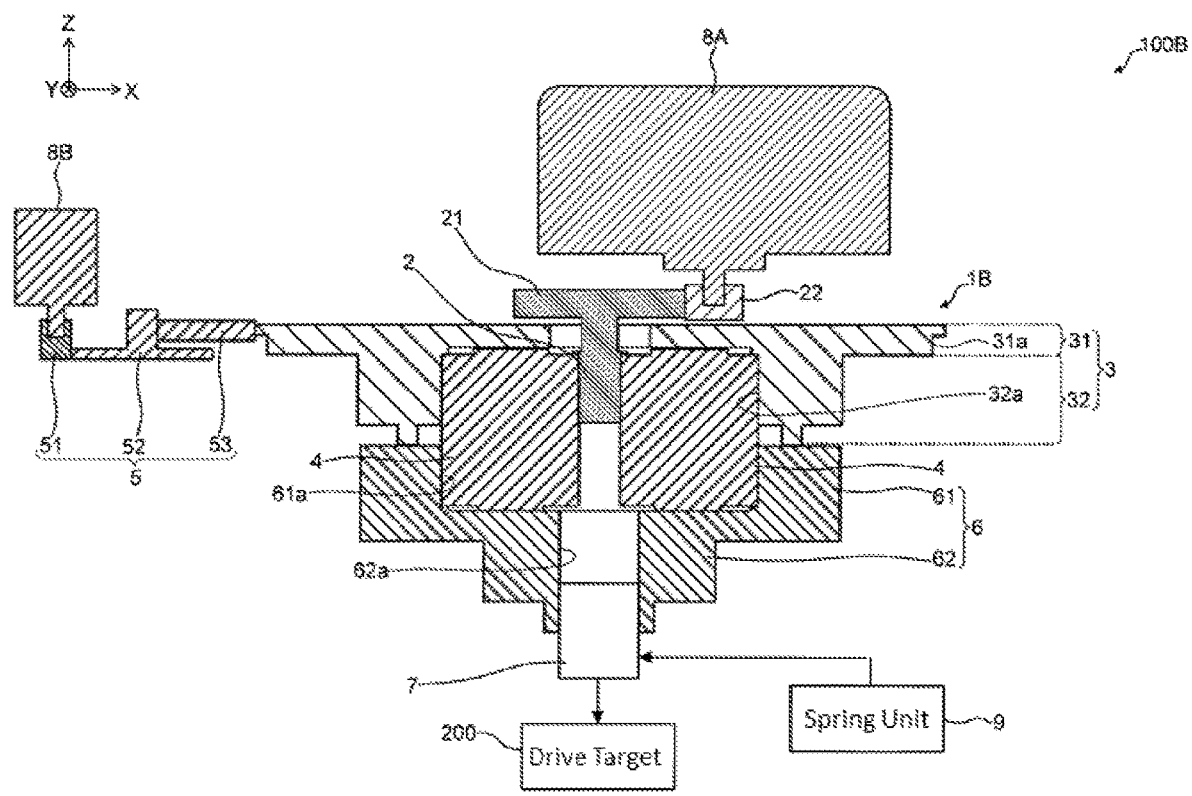
FIG. 6 is a cross-sectional view illustrating the main part of another setting/operating device having a gear mechanism between the driving motor and the sun gear.

In addition, although the driving motor 8A is directly coupled to the sun gear 2 in embodiments 1 and 2, the invention is not limited to these embodiments. For example, as illustrated in FIG. 6, the driving motor 8A and the sun gear 2 can be coupled to each other via a gear mechanism including gears 21 and 22 in a power transmission portion 1B.

Although application of the setting/operating device 100, 100A, 100B as a setting/operating device for operating the valve stem of the regulating valve has been illustrated in the above embodiments, the invention is not limited to the embodiments. For example, the setting/operating device 100, 100A, 100B can also be applied as a setting/operating device that operates a damper shaft of a damper.

In addition, although the individual components including the sun gear 2, the first internal gear 3, the plurality of planetary gears 4, the rotation control mechanism 5, and the second internal gear 6 are made of resin material in the embodiments described above, the invention is not limited to the embodiments and the individual components may be made of other material. For example, the individual components may be made of metal material (for example, steel material).

DESCRIPTION OF REFERENCE NUMERALS AND SIGNS 100, 100A, 100B: setting/operating device; 1, 1A, 1B: power transmission portion; 2: sun gear; 3: first internal gear; 4: planetary gear; 5: rotation control mechanism; 6: second internal gear (rotation mechanism); 7: output shaft; 8A: driving motor; 8B: fixing motor; 9: spring unit; 11: carrier (rotation mechanism); 11a: supporting surface; 11b: groove; 11c: hole; 31: external gear portion; 32: internal gear portion; 31a, 32a, 61a: tooth; 61: gear portion; 62: supporting portion; 62a: hole; 21, 22, 51, 52, 53: gear; 200: drive target

The invention claimed is:
1. A setting/operating device comprising:
a first motor;
a sun gear that rotates by receiving a rotating force from the first motor;
a first internal gear that comprises teeth on an inner peripheral surface thereof, the first internal gear being disposed so as to surround the sun gear;
a second motor that applies a force to the first internal gear in a direction in which rotation of the first internal gear is prevented;
a plurality of planetary gears that are disposed between the sun gear and the first internal gear, are engaged with the sun gear and the first internal gear, and are capable of rotating on axes thereof while revolving around the sun gear;
a rotation mechanism that rotates by receiving rotating forces of the plurality of planetary gears;
an output shaft that is coupled to the rotation mechanism; and
a spring unit that applies a rotating force to the output shaft when supply of electric power to the first motor and the second motor is stopped,
wherein the rotation mechanism comprises a second internal gear that comprises teeth on an inner peripheral surface thereof to be engaged with the planetary gears, the second internal gear being rotatable concentrically with the first internal gear.

2. The setting/operating device according to claim 1, wherein the second motor is adapted to have:
   a holding torque, when the second motor is excited, that is larger than the rotating force applied by the spring unit to the output shaft, and
   a detent torque that is smaller than the rotating force applied by the spring unit to the output shaft.

3. The setting/operating device according to claim 2, wherein the rotation mechanism comprises a carrier that supports the plurality of planetary gears rotatably on the axes thereof and transmits the motion of revolution of the plurality of planetary gears to the output shaft.

4. The setting/operating device according to claim 2, further comprising:
   a rotation control mechanism that is coupled to the second motor and the first internal gear and transmits, in the direction in which the rotation of the first internal gear is prevented, the holding torque of the second motor to the first internal gear.

5. The setting/operating device according to claim 4, wherein the rotation mechanism comprises a carrier that supports the plurality of planetary gears rotatably on the axes thereof and transmits the motion of revolution of the plurality of planetary gears to the output shaft.

6. The setting/operating device according to claim 1, wherein the rotation mechanism comprises a carrier that supports the plurality of planetary gears rotatably on the axes thereof and transmits the motion of revolution of the plurality of planetary gears to the output shaft.

\* \* \* \* \*